United States Patent
Bova et al.

(10) Patent No.: US 10,927,251 B2
(45) Date of Patent: Feb. 23, 2021

(54) PHENOL-CONTAINING POLYESTER MULTIPHASE POLYMER BLEND MATERIALS

(71) Applicant: UT-Battelle, LLC, Oak Ridge, TN (US)

(72) Inventors: Anthony S. Bova, McLean, VA (US); Amit K. Naskar, Knoxville, TN (US)

(73) Assignees: UT-Battelle, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 16/911,693

(22) Filed: Jun. 25, 2020

(65) Prior Publication Data

US 2020/0407553 A1 Dec. 31, 2020

Related U.S. Application Data (60) Provisional application No. 62/867,321, filed on Jun. 27, 2019.

(51) Int. Cl.
| | |
|---|---|
| *C08L 67/04* | (2006.01) |
| *C08L 71/02* | (2006.01) |
| *C08L 67/03* | (2006.01) |
| *C08L 97/00* | (2006.01) |

(52) U.S. Cl.
CPC .............. *C08L 67/04* (2013.01); *C08L 67/03* (2013.01); *C08L 71/02* (2013.01); *C08L 97/005* (2013.01)

(58) Field of Classification Search
CPC ........ C08L 67/00; C08L 67/02; C08L 67/025; C08L 67/03; C08L 67/04; C08L 67/06; C08L 67/07; C08L 67/08; C08L 71/00; C08L 71/02; C08L 71/03; C08L 71/08; C08L 71/10; C08L 71/12; C08L 71/123; C08L 71/126; C08L 71/14; C08L 97/00; C08L 97/005; C08L 97/02
See application file for complete search history.

(56) References Cited

U.S. PATENT DOCUMENTS

| | | | |
|---|---|---|---|
| 9,453,129 B2 | 9/2016 | Naskar | |
| 2002/0061583 A1* | 5/2002 | Kawamura | C08L 1/08 435/255.1 |
| 2005/0059795 A1* | 3/2005 | Bastioli | C08L 2666/26 528/272 |
| 2013/0116383 A1* | 5/2013 | Naskar | C08L 71/02 525/152 |
| 2013/0303738 A1 | 11/2013 | Cao et al. | |
| 2017/0166749 A1 | 6/2017 | Chen-Sarkanen et al. | |
| 2019/0225808 A1 | 7/2019 | Naskar et al. | |
| 2019/0225809 A1 | 7/2019 | Naskar et al. | |

FOREIGN PATENT DOCUMENTS

| | | |
|---|---|---|
| EP | 2576141 B1 | 3/2015 |
| WO | 2014/070830 A1 | 5/2014 |

OTHER PUBLICATIONS

Bugnicourt, E., et al., "Polyhydroxyalkanoate (PHA): Review of synthesis, characteristics, processing and potential applications in packaging", eXPRESS Polymer Letters, (2014), pp. 791-808, vol. 8, No. 11.
Kai, D., et al., "Sustainable and Antioxidant Lignin-Polyester Copolymers and Nanofibers for Potential Healthcare Applications", ACS Sustainable Chemistry & Engineering 2017, pp. 6016-6025, 5.
Liu, H., et al., "Lignin-Based Polymers via Graft Copolymerization", Journal of Polymer Science, Part A: Polymer Chemistry 2017, pp. 3515-3528, 55.
Mousavioun, P., et al., Environmental degradation of lignin/poly(hydroxybutyrate) blends, Polymer Degradation and Stability (2012), pp. 1114-1122, 97.
Ngo, T.-D., et al., "Lignin Bio-Based Material in Unsaturated Polyester", Cellulose Chemistry and Technology (2019), pp. 435-448, 53 (5-6).
Nitz, H., et al., "Reactive Extrusion of Polycaprolactone Compounds Containing Wood Flour and Lignin", Journal of Applied Polymer Science, (2001), pp. 1972-1984, vol. 81.
Park, I.-K., et al., "Solvent-free bulk polymerization of lignin-polycaprolactone (PCL) copolymer and its thermoplastic characteristics", Scientific Reports, 2019, 11 pages, 9:7033.
Sahoo, S., et al., "Enhanced properties of lignin-based biodegradable polymer composites using injection moulding process", Composites: Part A, (2011), pp. 1710-1718, 42.
Xing, Q., et al., "Biodegradable and High-Performance Poly(butylene adipate-co-terephthalate)-Lignin UV-Blocking Films", ACS Sustainable Chemistry & Engineering 2017, pp. 10342-10351, 5.
Xiong, S.-J., et al., "Economically Competitive Biodegradable PBAT/Lignin Composites: Effect of Lignin Methylation and Compatibilizer", ACS Sustainable Chemistry & Engineering, pp. 5338-5346, 8.
International Search Report dated Oct. 2, 2020 together with the Written Opinion received in International Application No. PCT/US20/39556.

* cited by examiner

*Primary Examiner* — Christopher M Rodd
(74) *Attorney, Agent, or Firm* — Scully, Scott, Murphy & Presser, P.C.

(57) ABSTRACT

A solid multiphase polymer blend material comprising: (i) a polyphenolic substance having a molecular weight of at least 500 g/mol; and (ii) a polyester having a molecular weight of at least 500 g/mol; wherein at least a portion of the polyphenolic substance is covalently bonded directly or through a linking moiety to the polyester. Methods for producing the blend material are also described, e.g., homogeneously melt blending a mixture comprising components (i) and (ii) under conditions resulting in covalent attachment of at least a portion of the polyphenolic substance directly or through a linking moiety to the polyester. Methods for producing objects made of the blend material by melt extrusion are also described.

28 Claims, 3 Drawing Sheets

PHENOL-CONTAINING POLYESTER MULTIPHASE POLYMER BLEND MATERIALS

CROSS-REFERENCE TO RELATED APPLICATIONS

The present application claims benefit of U.S. Provisional Application No. 62/867,321 filed Jun. 27, 2019, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates generally to multiphase polymer blend compositions, and more particularly, to such compositions containing a polyphenolic substance as a component.

BACKGROUND OF THE INVENTION

Binary lignin-polymer alloys have been prepared using a combination of high-shear melt processing and proper selection of a polar matrix polymer. Many of those materials are known to possess attractive mechanical properties, with lignin compositions as high as 70 wt %. To date, the matrix polymers used have been primarily petroleum based, often including some amount of polybutadiene. Some conventional matrix polymers include high polarity variants of nitrile butadiene (NBR), wherein the high polarity permits for increased miscibility between lignin and the NBR phase. Although these materials are attractive for some applications, their high melt viscosities are not well suited for extrusion, injection molding, or 3D printing. In addition, while the use of lignin in these materials beneficially increases the renewable content, the non-renewable matrix component, in which lignin is incorporated, detracts from the overall environmental benefits of these materials. Thus, there would be a particular advantage in lignin-containing materials containing fully renewable components along with physical characteristics more suited for use in injection molding or additive manufacturing. There would be a further advantage in such materials containing exceptionally high amounts of lignin or other polyphenolic substance (e.g., at least or greater than 50, 60, 70, 75, or 80 wt %) while retaining the improved characteristics described above.

SUMMARY OF THE INVENTION

In one aspect, the present disclosure is directed to solid polymer blend materials that have desirable physical properties along with greater renewable content and reduced reliance on petroleum sources. The polymer blend materials described herein may contain lignin or other polyphenolic substance in exceptionally high amounts (e.g., at least or greater than 50, 60, 70, 75, or 80 wt %) while exhibiting attractive mechanical properties well suited for extrusion, injection molding, or 3D printing. More specifically, the polymer blend materials have the following composition: (i) a polyphenolic substance (e.g., lignin) having a molecular weight of at least 500 g/mol; and (ii) a polyester (e.g., polyhydroxyalkanoate, such as polycaprolactone, polylactic acid, or polyglycolic acid, or diol-diacid polyester) having a molecular weight of at least 500 g/mol. Moreover, in the composition, at least a portion of the polyphenolic substance is covalently bonded directly or through a linking moiety to the polyester. Notably, in particular embodiments, the resulting polymer blend material has a two-phase morphology, and the domain size and structure of the lignin or other polyphenolic substance can be controlled by manipulating the amount of or type of lignin or other polyphenolic substance, or by judicious selection of type of additive or processing conditions.

In another aspect, the present disclosure is directed to methods for producing the polymer blend material and for producing objects therefrom. The method for producing the polymer blend material includes homogeneously blending a mixture comprising: (i) a polyphenolic substance having a molecular weight of at least 500 g/mol; and (ii) a polyester having a molecular weight of at least 500 g/mol, under conditions resulting in covalent attachment of at least a portion of the polyphenolic substance directly or through a linking moiety to the polyester. In some embodiments, the conditions resulting in covalent attachment include incorporating into the mixture a molecule that promotes covalent attachment of at least a portion of the polyphenolic substance directly or through a linking moiety to the polyester. The molecule that promotes covalent attachment may be, for example, (i) a polycarboxylic acid or polyester molecule having a molecular weight less than 500 g/mol (e.g., citric acid), (ii) a lignosulfonate, or (iii) a metal alkoxide, such as an aluminum alkoxide or titanium alkoxide.

BRIEF DESCRIPTION OF THE FIGURES

FIG. 1A depicts an interpenetrating network and FIG. 1B depicts an occluded network. The black domains represent the polyphenolic polymer (e.g., lignin) and the white (transparent) domains represent the matrix polyester polymer.

DETAILED DESCRIPTION OF THE INVENTION

In a first aspect, the present disclosure is directed to a solid polymer blend material that includes: (i) a polyphenolic substance (e.g., lignin) having a molecular weight of at least 500 g/mol; and (ii) a polyester having a molecular weight of at least 500 g/mol, wherein at least a portion of the polyphenolic substance is covalently bonded directly or through a linking moiety to the polyester. Generally, the polyphenolic substance is homogeneously dispersed in the polyester. The terms "polymer blend" and "homogeneously dispersed," as used herein, refer to a solid solution in which discrete microscopic regions of components (i) and/or (ii) are present. Since discrete regions are present, the polymer blend material is also herein referred to as a multiphase polymer blend.

The polymer blend may exhibit substantial integration (i.e., near homogeneous) at the microscale or approaching the molecular level, but without losing each component's identity. Generally, one of the components (i) or (ii) functions as a matrix in which domains (i.e., particles or microscopic regions) of the other component (i) or (ii) are dispersed. In particular embodiments of the polymer blend material, the polyester component (ii) functions as a matrix in which the polyphenolic component (i) is dispersed in the form of domains having any of the exemplary sizes provided hereinbelow. The domains generally have a size up to or less than 100 microns (100 μm). In different embodiments, the domains have a size up to or less than, for example, 50 μm, 10 μm, 5 μm (5000 nm), 2 μm (2000 nm), 1 μm (1000 nm), 800 nm, 500 nm, 200 nm, 100 nm, 50 nm, 25 nm, 10 nm, or 5 nm, or within a range bounded by any of these values. Any of the above exemplary domain sizes may alternatively represent a mean or median domain size, as found in a particle size distribution curve. For example, in some embodiments, at least 80%, 85%, 90%, or 95% of the domains have a size up to or less than any exemplary values provided above. In some embodiments, substantially all (e.g., above 95%) or all (i.e., 100%) of the domains have a size up to or less than any exemplary values provided above.

In some embodiments, the polymer blend material possesses a tensile yield stress (or "yield stress" or "tensile yield strength") of at least or above 10 MPa. In different embodiments, the tensile yield stress is at least or above 10 MPa, 15 MPa, 20 MPa, 25 MPa, 30 MPa, 35 MPa, 40 MPa, 50 MPa, 60 MPa, 70 MPa, 80 MPa, 90 MPa, 100 MPa, or 150 MPa, or a yield stress within a range bounded by any two of the foregoing exemplary values. As understood in the art, the term "tensile yield strength" or "yield stress" refers to the stress maxima in the stress-strain curve experienced by the polymer during tensile deformation just after the linear elastic region; polymers deformed beyond the yield stress usually show permanent deformation. Beyond the "tensile yield stress" point in the stress-strain profile of the polymer, the stress experienced by the polymer during stretching may remain less than that of the yield stress. Thus, "tensile strength" that is defined as the stress experienced by polymer at fracture or failure point can be lower than the yield strength. In some polymers, the tensile stress experienced at failure is significantly higher than that of the yield stress. In such cases, the stress-strain curve shows a rise (sometimes steep rise) in stress with increase in strain due to enhanced molecular orientation along the direction of deformation. Such a phenomenon of increase in the stress at large strain values (as the polymer molecules orient) is known as "strain hardening". For some of the exemplary yield stress values provided above, the tensile strength (i.e., the tensile stress experienced at failure) of the polymer blend will be higher according to the known difference in how yield stress and tensile strength are defined.

The polymer blend material may also possess an ultimate elongation of at least 1%. In different embodiments, the polymer blend material may exhibit an ultimate elongation of about or at least 1, 2, 3, 4, 5, 6, 7, 8, 9, 10, 20, 30, 40, 50, 60, 70, 80, 90, 100, 150, 200, 250, or 300%, or an ultimate elongation within a range bounded by any two of the foregoing exemplary values. In some embodiments, the polymer blend material possesses any of the foregoing elongation characteristics along with any of the foregoing yield stress or tensile strength characteristics, also provided above. In some embodiments, the polymer blend material exhibits less than 1% ultimate elongation. The polymer blend material may possess a tensile modulus of at least 1, 2, 3, 4, 5, 10, 12, 15, 18, 20, 22, 25, or 30 GPa, or a tensile modulus within a range bounded by any two of the foregoing values.

The polymer blend material contains, as a first component, a polyphenolic substance. The polyphenolic substance has a molecular weight of at least or above 500, 1000, 1500, 2000, 2500, 3000, 5000, or 10,000 g/mol, or a molecular weight within a range bounded by any two of the foregoing values. The term "polyphenolic," as used herein, indicates the presence of at least three phenolic units, wherein a phenolic unit is an aromatic ring (typically a benzene ring) directly bound to at least one hydroxy (OH) group. More typically, the polyphenolic substance contains at least or more than 3, 4, 5, 10, 12, 15, 20, 25, 50, or 100 phenolic units. Some examples of polyphenolic substances include lignins, tannins (e.g., tannic acid), tannin derivatives (e.g., ellagitannins and gallotannins), poly(4-hydroxystyrene), poly(styrene-co-allyl alcohol), phenol-formaldehyde resins, novolaks, and resoles.

The polyphenolic substance is typically present in the polymer blend material in an amount of at least 1 wt % (by weight of the polymer blend). In different embodiments, the polyphenolic substance is included in the polymer blend in an amount of precisely, about, or at least, for example, 1, 2, 5, 10, 15, 20, 25, 30, 35, 40, 45, 50, 55, 60, 65, 70, or 75 wt %, or an amount within a range bounded by any two of the foregoing values (e.g., 1-75 wt %, 2-75 wt %, 5-75 wt %, 1-70 wt %, 2-70 wt %, 5-70 wt %, 1-60 wt %, 2-60 wt %, 5-60 wt %, 1-50 wt %, 2-50 wt %, or 5-50 wt %).

In particular embodiments, the polyphenolic substance is a lignin, which may be included in the polymer blend material in any of the amounts set forth above. The lignin can be any of the wide variety of lignin compositions found in nature in lignocellulosic biomass and as known in the art. As known in the art, the lignin compositions found in nature are generally not uniform. Lignin is a random copolymer that shows significant compositional variation between plant species. Many other conditions, such as environmental conditions, age, and method of processing, influence the lignin composition. Lignins are very rich aromatic compounds containing many hydroxyl (also possible carboxylic) functional groups attached differently as both aliphatic and phenolic groups. Additionally, some lignins possess highly-branched structures. These characteristics of lignins determine their corresponding physical properties. The molar mass or molecular weight ($M_w$) of the lignin is generally broadly distributed, e.g., from approximately 1000 Dalton (D) to over 10,000 D. In typical embodiments, the lignin may have a number-average or weight-average molecular weight (i.e., $M_n$ or $M_w$, respectively) of about, up to, or less than, for example, 300, 500, 1,000, 3,000, 5,000, 8,000, 10,000, 50,000, 100,000, 500,000 or 1,000,000 g/mol, or a weight within a range bounded by any two of the foregoing values, such as 500-10,000 g/mol or 500-5,000 g/mol [G. Fredheim, et al., *J. Chromatogr. A*, 2002, 942, 191; and A. Tolbert, et al., *Biofuels, Bioproducts & Biorefining* 8(6) 836-856 (2014)] wherein the term "about" generally indicates no more than ±10%, ±5%, or ±1% from an indicated value.

In some embodiments, the lignin is significantly deploymerized when isolated from its native biomass source and has a molar mass of less than 1000 D. Their natural branches and low $M_w$ generally result in very brittle characteristics. The aromatic structures and rich functional groups of lignins also lead to varied rigid and thermal properties. Lignins are amorphous polymers, which results in very broad glass transition temperatures ($T_g$), from ca. 80°

C. to over 200° C. The glass transition temperatures are critical temperatures at which the lignin macromolecular segments become mobile. Some lignins exhibit a very good flow property (low molten viscosity), whereas others display several orders of magnitude higher viscosity.

Lignins differ mainly in the ratio of three alcohol units, i.e., p-coumaryl alcohol, guaiacyl alcohol, and sinapyl alcohol. The polymerization of p-coumaryl alcohol, coniferyl alcohol, and sinapyl alcohol forms the p-hydroxyphenyl (H), guaiacyl (G) and syringyl (S) components of the lignin polymer, respectively. The lignin can have any of a wide variety of relative weight percents (wt %) of H, G, and S components. As observed in some seeds, lignin may also consist of caffeyl alcohol units, e.g., Chen et al. PNAS, 109(5), 1772-1777 (2012). For example, the precursor lignin may contain, independently for each component, at least, up to, or less than 1 wt %, 2 wt %, 5 wt %, 10 wt %, 20 wt %, 30 wt %, 40 wt %, 50 wt %, 60 wt %, 70 wt %, 80 wt %, or 90 wt %, or within a range thereof, of any of the caffeyl alcohol, H, G, and S components. Typically, the sum of the wt % of each alcohol component is 100%, or at least 98% if other minor components are considered. Different wood and plant sources (e.g., hardwood (HW), such as oak, maple, poplar, and the like; softwood (SW), such as pine, spruce, and the like; or grass-derived lignins, such as switch grass, corn, bamboo, perennial grass, orchard grass, alfalfa, wheat, *miscanthus*, bamboo, and bagasse) often widely differ in their lignin compositions, and are all considered herein as sources of lignin. In some embodiments, depending on the desired characteristics of the polymer blend material, any one or more types of lignin, as described above, may be excluded from the polymer blend material.

Besides the natural variation of lignins, there can be further compositional variation based on the manner in which the source lignin has been processed. For example, the source lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin present in biomass to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfite (depending on pH), along with a counterion, is reacted with lignin to form a lignin bearing sulfonate ($SO_3H$) groups. The sulfonate groups impart a substantial degree of water-solubility to the sulfite lignin.

There are several types of sulfur-free lignins known in the art, including lignin obtained from biomass conversion technologies (such as those used in ethanol production), solvent pulping (i.e., the "organosolv" process), soda pulping (i.e., "soda lignin"), and supercritical water fractionation or oxidation (i.e., "supercritical water fractionated lignin"). In particular, organosolv lignins are obtained by solvent extraction from a lignocellulosic source, such as chipped wood, followed by precipitation. The solvent system in organosolv delignification of biomass often include organic alcohols, such as methanol, ethanol, propanol, butanol, and isobutyl alcohol; aromatic alcohols, such as phenol and benzyl alcohol; glycols, such as ethylene glycol, triethylene glycol, propylene glycol, butylene glycol and other higher glycols; ketones, such as acetone, methyl ethyl ketone and methyl isobutyl ketone; organic acids, such as formic acid, acetic acid and propionic acid, amines, esters, diethyl ether, dioxane, glycerol, or mixture of these solvents. Typically, some degree of dilute acid pretreatment of biomass helps the delignification process. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devolatilized to produce a variant with less aliphatic hydroxyl groups, and molecularly restructured forms with an elevated softening point. Any one or more of the foregoing types of lignins may be used (or excluded) as a component in the method described herein for producing a polymer blend.

The lignin may also be an engineered form of lignin having a specific or optimized ratio of H, G, and S components. Lignin can be engineered by, for example, transgenic and recombinant DNA methods known in the art that cause a variation in the chemical structure in lignin and overall lignin content in biomass (e.g., F. Chen, et al., *Nature Biotechnology*, 25(7), pp. 759-761 (2007) and A. M. Anterola, et al., Phytochemistry, 61, pp. 221-294 (2002)). The engineering of lignin is particularly directed to altering the ratio of G and S components of lignin (D. Guo, et al., *The Plant Cell*, 13, pp. 73-88, (January 2001). In particular, wood pulping kinetic studies show that an increase in S/G ratio significantly enhances the rate of lignin removal (L. Li, et al., *Proceedings of The National Academy of Sciences of The United States of America*, 100 (8), pp. 4939-4944 (2003)). The S units become covalently connected with two lignol monomers; on the other hand, G units can connect to three other units. Thus, an increased G content (decreasing S/G ratio) generally produces a highly branched lignin structure with more C—C bonding. In contrast, increased S content generally results in more β-aryl ether (β-O-4) linkages, which easily cleave (as compared to C—C bond) during chemical delignification, e.g., as in the Kraft pulping process. It has been shown that decreasing lignin content and altering the S/G ratio improve bioconvertability and delignification. Thus, less harsh and damaging conditions can be used for delignification (i.e., as compared to current practice using strong acid or base), which would provide a more improved lignin better suited for higher value applications, including manufacturing of tough polymer blends, carbon materials production (e.g., carbon fiber, carbon powder, activated carbon, microporous and mesoporous carbon) and pyrolytic or catalytic production of aromatic hydrocarbon feedstock.

Lab-scale biomass fermentations that leave a high lignin content residue have been investigated (S. D. Brown, et al., *Applied Biochemistry and Biotechnology*, 137, pp. 663-674 (2007)). These residues will contain lignin with varied molecular structure depending on the biomass source (e.g., wood species, grass, and straw). Production of value-added products from these high quality lignins would greatly improve the overall operating costs of a biorefinery. Various chemical routes have been proposed to obtain value-added products from lignin (J. E. Holladay, et al., Top Value-Added Chemicals from Biomass: Volume II—Results of Screening for Potential Candidates from Biorefinery Lignin, DOE Report, PNNL-16983 (October 2007)).

The lignin may, in some embodiments, be a crosslinked lignin that is melt-processible or amenable to melt-processing. The term "crosslinked" can mean, for example, that the lignin contains methylene (i.e., —$CH_2$—) and/or ethylene (i.e., —$CH_2CH_2$—) linkages (i.e., linking groups) between phenyl ring carbon atoms in the lignin structure. By being

"melt-processible" is meant that the crosslinked lignin can be melted or converted to a molten, highly viscous, or rubbery state starting at a particular glass transition temperature. The melted or highly viscous lignin can then be more easily processed, such as by mixing, molding, applying on a surface, or dissolving in a solvent. In some embodiments, the lignin is not crosslinked. In particular embodiments, the lignin component exhibits a suitable steady shear viscosity to render it as a malleable film-forming material at the processing temperature and shear rate employed. Typically, at a melt processing condition, the steady shear viscosity (e.g., at 1-100 s$^{-1}$ shear rate regime) of the lignin component is at least or above 100 Pa·s, 500 Pa·s, 1000 Pa·s, 3000 Pa·s, or 5000 Pa·s, or within a range therein. In some embodiments, lignin forms a highly viscous melt (on the order of 10,000 Pa·s complex viscosity or higher) at a 100 s$^{-1}$ shear rate. In some embodiments, the lignin may be oxidized (e.g., by exposure to a chemical oxidizing agent), while in other embodiments, the lignin is not oxidized. In some embodiments, the lignin is chemically unmodified relative to its natural extracted or isolated form. In some embodiments, the lignin is chemically modified by acetylation, oxypropylation, hydroxymethylation, epoxidation, or the like, as known in the art. In some embodiments, the lignin is plasticized with solvents or plasticizers to induce melt-processability. Solvents and plasticizers include, for example, dimethylsulfoxide, dimethylacetamide, polyoxyalkylene, and glycerol, as known in the art. In some embodiments, the use of a solvent or plasticizer is excluded.

In different embodiments, the lignin (either isolated or extracted lignin from biomass or its crosslinked derivative) has a glass transition temperature of precisely or about, for example, 40° C., 50° C., 60° C., 70° C., 80° C., 90° C., 100° C., 105° C., 110° C., 115° C., 120° C., 125° C., 130° C., 140° C., 150° C., 160° C., 170° C., 180° C., 190° C., 200° C., 210° C., 220° C., 230° C., or 240° C., or a $T_g$ within a range bounded by any two of the foregoing values. In some embodiments, the lignin does not exhibit a detectable $T_g$, unless mixed with a plasticizing component such as solvent, or polymeric additives. The polymer blend material in which the lignin is incorporated may also possess any of the glass transition temperatures or ranges thereof provided above.

The lignin (in either raw form isolated from biomass or a crosslinked derivative) may be substantially soluble in a polar organic solvent or aqueous alkaline solution. As used herein, the term "substantially soluble" generally indicates that at least 1, 2, 5, 10, 20, 30, 40, 50, or 60 grams of the lignin completely dissolves in 1 deciliter (100 mL) of the polar organic solvent or aqueous alkaline solution. In other embodiments, the solubility is expressed as a wt % of the lignin in solution. In some embodiments, the lignin has sufficient solubility to produce at least a 5 wt %, 10 wt %, 15 wt %, 20 wt %, 30 wt %, 40 wt %, or 50 wt % solution in the polar organic solvent or aqueous alkaline solution. The polar organic solvent can be aprotic or protic. Some examples of polar aprotic solvents include the organoethers (e.g., diethyl ether, tetrahydrofuran, and dioxane), nitriles (e.g., acetonitrile, propionitrile), sulfoxides (e.g., dimethylsulfoxide), amides (e.g., dimethylformamide, N, N-dimethylacetamide), organochlorides (e.g., methylene chloride, chloroform, 1,1,-trichloroethane), ketones (e.g., acetone, 2-butanone), and dialkylcarbonates (e.g., ethylene carbonate, dimethylcarbonate, diethylcarbonate). Some examples of polar organic protic solvents include the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine) The aqueous alkaline solution can be any aqueous-containing solution having a pH of at least (or over) 8, 9, 10, 11, 12, or 13. The alkalizing solute can be, for example, an alkali hydroxide (e.g., NaOH or KOH), ammonia, or ammonium hydroxide. Combinations of any of these solvents may also be used. In some embodiments, the lignin is dissolved in a solvent, such as any of the solvents described above, when used to form the polymer blend. The solvent may or may not be incorporated into the final polymer blend material. In some embodiments, one or more classes or specific types of solvents (or all solvents) are excluded from any of the components (i) or (ii) or from the polymer blend material altogether.

The polymer blend material contains, as a second component, a polyester. For purposes of the present invention, the polyester is a polymer containing ester (—C(O)O—) linkages at least in a backbone of the polyester polymer. The polyester polymer may or may not also have ester groups in pendant portions or terminal positions of the polymer. The polyester polymer can have any of a variety of possible number-average or weight-average molecular weights ($M_n$ or $M_w$, respectively). The polyester has a molecular weight of at least 500 g/mol. In different embodiments, the polyester has a molecular weight of about, at least, greater than, up to, or less than, for example, 500 g/mol, 800 g/mol, 1,000 g/mol, 2,500 g/mol, 5,000 g/mol, 10,000 g/mol, 20,000 g/mol, 30,000 g/mol, 40,000 g/mol, 50,000 g/mol, 75,000 g/mol, 100,000 g/mol, 150,000 g/mol, 200,000 g/mol, 300,000 g/mol, 500,000 g/mol, or 1,000,000 g/mol, or a molecular weight within a range bounded by any two of the foregoing exemplary values. The polyester may be amorphous, semi-crystalline, or polycrystalline. Generally, the polyester has a melting point below the decomposition temperature of the lignin or other polyphenolic substance with which the polyester is to be blended. In various embodiments, the polyester has a melting point of precisely, about, up to, or less than, for example, 50° C., 100° C., 150° C., 180° C., or 200° C., or a melting point within a range bounded by any two of the foregoing values.

In some embodiments, the polyester is a polyhydroxyalkanoate, which corresponds to the following generic structure:

In Formula (1), $R^1$ is selected from a hydrogen atom (H) or hydrocarbon group (R). The hydrocarbon group (R) can be any saturated or unsaturated hydrocarbon group, typically containing 1, 2, 3, 4, 5, 6, 7, 8, 9, 10, 11, or 12 carbon atoms or a number of carbon atoms within a range bounded by any two of the foregoing values (e.g., 1-12, 2-12, 3-12, 1-6, 1-4, or 1-3 carbon atoms). The hydrocarbon group (R) may be, for example, a straight-chained (linear) or branched alkyl or alkenyl group, or saturated or unsaturated cyclic hydrocarbon group. In some embodiments, the hydrocarbon group (R) is an alkyl group having one, two, three, four, five, or six carbon atoms, such as a methyl, ethyl, n-propyl, isopropyl, n-butyl, sec-butyl, n-pentyl, isopentyl, cyclopentyl, n-hexyl, isohexyl, or cyclohexyl group. The hydrocarbon group may, in some cases, be an unsaturated ring, such as a phenyl group. The hydrocarbon group may also be composed solely of carbon and hydrogen atoms, or may contain one or more heteroatoms selected from oxygen, nitrogen, and halogen atoms. Thus, in the case of cyclic hydrocarbon groups, the cyclic group may be a carbocyclic group or a heterocyclic group. The variable t is typically an integer from 0 to 4. The subscript t is more typically an integer from 0 to 3 (i.e., t is typically 0, 1, 2, or 3). The variable n is typically an integer of at least 10. In different embodiments, the subscript n is an integer of at least or greater than 10, 20, 50, 100, 200, 500, 1000, 1500, 2000, 2500, or 5000, or a value within a range bounded therein, or n can be a value that results in any of the exemplary molecular weights provided above. In some embodiments, any of the above classes or specific types of polyesters may be excluded from the polyester shell.

When t is 0, Formula (1) depicts a polymer of an alpha-hydroxy (α-hydroxy) acid. An example of an α-hydroxy polymer when $R^1$ in Formula (1) is H is polyglycolic acid (PGA). An example of an α-hydroxy polymer when $R^1$ is methyl is polylactic acid (i.e., PLA, polymer of 2-hydroxypropionic acid, also known as poly-L-lactic acid, poly-D-lactic acid, or poly-DL-lactic acid). An example of an α-hydroxy polymer when $R^1$ is phenyl is polymandelic acid. When t is 1, Formula (1) depicts a polymer of a beta-hydroxy (β-hydroxy) acid. An example of a β-hydroxy polymer when $R^1$ is H is poly(3-hydroxypropionic acid). An example of a β-hydroxy polymer when $R^1$ is methyl is poly(3-hydroxybutyric acid) (i.e., P3HB). An example of a β-hydroxy polymer when $R^1$ is ethyl is poly(3-hydroxyvaleric acid) (i.e., PHV). An example of a β-hydroxy polymer when $R^1$ is n-propyl is poly(3-hydroxyhexanoic acid) (i.e., PHH). When t is 2, Formula (1) depicts a polymer of a gamma-hydroxy (γ-hydroxy) acid. An example of a γ-hydroxy polymer when $R^1$ is H is poly(4-hydroxybutyric acid) (i.e., P4HB). An example of a γ-hydroxy polymer when $R^1$ is methyl is poly(4-hydroxyvaleric acid). Some examples of polyhydroxyalkanoates with t=3 include poly(5-hydroxyvaleric acid) and poly(5-hydroxyhexanoic acid). An example of a polyhydroxyalkanoate with t=4 includes poly(6-hydroxyhexanoic acid), also known as polycaprolactone (PCL). In some cases, the polyhydroxyalkanoate may be selected from poly(hydroxypropionic acid)s, poly(hydroxybutyric acid)s, poly(hydroxyvaleric acid)s, or poly(hydroxyhexanoic acid)s. The hydroxy acid need not be within the scope of Formula (1) to be suitable. For example, a polymer of salicylic acid may or may not also be considered. In some embodiments, any of the above classes or specific types of polyesters may be excluded from the polyester shell.

Copolymers of the hydroxy acids are also considered herein. In some embodiments, two or more different types of hydroxyalkanoates are in the copolymer, such as in (poly(lactic-co-glycolic acid) (i.e., PLGA), poly(3-hydroxybutyrate-co-3-hydroxyvalerate) (i.e., PHBV), or poly(3-hydroxybutyrate-co-3-hydroxyhexanoate). In other embodiments, the copolymer includes one or more non-hydroxyalkanoate portions, as in poly(glycolide-co-trimethylene carbonate) and poly(lactide-co-polyethylene glycol). In the case of a PLGA copolymer, the lactic acid (LA) and glycolic acid (GA) units in the PLGA copolymer may, in some embodiments, be independently present in a molar amount of 40-60%, wherein the molar amounts of lactic acid and glycolic acid units sum to 100%. The LA:GA molar ratio may be precisely or about, for example, 5:95, 10:90, 20:80, 30:70, 40:60, 45:55, 50:50, 55:45, or 60:40, or within a range between any two of the foregoing ratios. In some embodiments, any of the above classes or specific types of polyesters may be excluded from the polyester shell.

In some embodiments, the polyester is a diol-diacid type of polyester, i.e., a polyester resulting from the condensation of a diol with a diacid. The diol-diacid types of polyesters can be defined by the following generic structure:

(2)

In the above Formula (2), $R^2$ and $R^3$ are independently selected from hydrocarbon linking groups, which can be derived from hydrocarbon groups (R) containing 1-12 carbon atoms, as defined above, by replacing another hydrogen atom of the hydrocarbon group with a bond. For example, a methyl ($—CH_3$) group, selected from R groups, can have a hydrogen atom removed to result in a methylene ($—CH_2—$) linking group corresponding to $R^2$ and/or $R^3$. The variable n is as described above. In some embodiments, one or both (or at least one) of the linking groups $R^2$ and $R^3$ are independently selected from alkylene groups, i.e., linking groups of the formula $—(CH_2)_m—$, where m is typically 1-12. In other embodiments, one or both (or at least one) of the linking groups $R^2$ and $R^3$ are independently selected from saturated or unsaturated carbocyclic or heterocyclic groups (e.g., cyclopentyl, cyclohexyl, phenylene, and furan groups). In a first set of particular embodiments, $R^2$ is phenylene and $R^3$ is an alkylene group, in which case the polyester can be generally classified as a polyalkylene terephthalate. In the case where $R^2$ is phenylene and $R^3$ is methylene ($—CH_2—$), the polyester is a polymethylene terephthalate (PMT); in the case where $R^2$ is phenylene and $R^3$ is ethylene ($—CH_2CH_2—$), the polyester is a polyethylene terephthalate (PET); in the case where $R^2$ is phenylene and $R^3$ is propylene ($—CH_2CH_2CH_2—$), the polyester is a polypropylene terephthalate (PPT); in the case where $R^2$ is phenylene and $R^3$ is butylene ($—CH_2CH_2CH_2CH_2—$), the polyester is a polybutylene terephthalate (PBT). In a second set of particular embodiments, $R^2$ and $R^3$ are independently selected from alkylene groups. In the particular case where $R^2$ is ethylene, the polyester of Formula (2) is herein referred to as a succinate-based polyester, e.g., a polyethylene succinate (PES), when $R^3$ is also ethylene; or a polypropylene succinate (PPS), when $R^3$ is propylene; or a polybutylene succinate (PBS), when $R^3$ is butylene. In the particular case where $R^2$ is butylene, the polyester of Formula (2) is herein referred to as an adipate-based polyester, e.g., a polyethylene adipate, when $R^3$ is ethylene; or a polypropylene adipate, when $R^3$ is propylene; or a polybutylene adipate, when $R^3$ is also butylene (or a copolymer thereof, e.g., polybutylene adipate terephthalate). In some embodiments, $R^2$ in Formula (2) may be a bond, which results in oxalate-based polyesters, such as polyethylene oxalates, when $R^3$ is ethylene. Other less common or more specialized polyesters according to Formula (2) are considered herein, such as when $R^2$ is naphthyl, which corresponds to the naphthalate-based polyesters, such as polyethylene naphthalate (PEN), when $R^3$ is ethylene, or polybutylene naphthalate (PBN), when $R^3$ is butylene. In some embodiments, any of the above classes or specific types of polyesters may be excluded from the polyester shell.

The polyester may alternatively be any of the vinyl ester and unsaturated polyester resins well known in the art. Vinyl ester resins are described, for example, in S. Jaswal et al., *Reviews in Chemical Engineering*, 30(6), 567-581 (2014); H. M. Kang et al., *Journal of Applied Polymer Science*, 79:1042-1053 (2001); and M. A. F. Robertson et al., *J. Adhesion*, 71:395-416 (1999), the contents of which are herein incorporated by reference in their entirety. Unsaturated polyester resins are described in, for example, H. Yang et al., *Applied Polymer*, 79(7), 1230-1242, 2001; M. Malik et al., *J. Macromol. Sci. Rev. Macromol. Chem. Phys.*, C40(2&3), 139-165 (2000); and M. Olesky et al., *Ind. Eng. Chem. Res.*, 52(20), 6713-6721 (2013), the contents of which are herein incorporated by reference in their entirety. The unsaturated polyester may contain at least one carbon-carbon double bond as an intramolecular (backbone) or pendant vinyl group, such as found in polyesters containing an amount of muconic or itaconic acid monomer content. Some examples of such unsaturated polyesters include the polyalkylene muconates (e.g., polybutylene muconate) and the polyalkylene itaconates (e.g., polybutylene itaconate). Such unsaturated polyesters may advantageously undergo free-radical generation under high shear mixing in the presence of an oxidant, such as oxygen, ozone, or a peroxide. In turn, the free-radical generation could be scavenged by the polyphenolic substance, thereby inducing bonding between components (i) and (ii). The unsaturated portion of the polyester may also react with a thiol-containing polyphenolic substance (for example, Kraft lignin) to create bonds between components (i) and (ii). In some embodiments, any of the above classes or specific types of polyesters may be excluded from the polyester shell.

In particular embodiments, the polyester is an aliphatic polyester with some amount of muconic or itaconic acid monomer content. The muconic or itaconic acid monomer content provides intramolecular vinyl groups or pendant vinyl groups, respectively. These reactive groups can serve as locations for free-radical generation under high shear mixing in the presence of oxygen or ozone. In high shear mixing, the presence of oxygen or ozone can create free radicals on the matrix polymer. Hindered phenolic structures in the polyphenolic material can capture these free radicals, resulting in a covalent bond between the two materials. Radical generation may be further induced with the addition of a peroxide, such as a bio-based organic peroxide. Another grafting mechanism would be to include at least some amount of the lignin as Kraft lignin. Kraft lignin has a number of thiol groups generated from the Kraft pulping of woody biomass. Thiol groups are known to undergo a "click reaction" with vinyl groups. These thiol groups in Kraft lignin can readily react with intramolecular or pendant vinyl groups on the matrix polymer.

The polyester can be functionalized (e.g., in the interior or terminated) by any of the functional groups known in the art. In some embodiments, the polyester is acid-functionalized (i.e., functionalized with one or two carboxylic acid groups). In other embodiments, the polyester is ester-functionalized (i.e., functionalized with one or two carboxylic acid ester groups). In other embodiments, the polyester is hydroxy-functionalized. In yet other embodiments, the polyester is amine- or amide-functionalized. The polyester may also have a combination of functionalizing groups, e.g., ester and hydroxy, or carboxylic acid and hydroxy. Any such functional groups in the polyester may useful, under appropriate conditions, for promoting bonding with the polyphenolic substrate, such as by formation of ester and/or amide linkages between components (i) and (ii).

In some embodiments, a single polyester is used in the polymer blend material. However, the term "polyester," as used herein, includes the possibility of a combination of polyesters, such as a combination of any of the polyesters described above. Polyesters other than those specifically described above may also be used, e.g., cellulose esters, starch esters, and polysaccharide carboxylate esters, either alone or in combination with another polyester. In some embodiments, two or more different polyhydroxyalkanoates are used (e.g., PLA and PCL). In other embodiments, two or more different diol-diacid types of polyesters are used (e.g., PET and PBS). In other embodiments, a combination of a polyhydroxyalkanoate and diol-diacid polyester may be used (e.g., PLA and PBS, or PCL and PBS). In some embodiments, any of the above described polyesters are excluded from the polymer blend material.

In the polymer blend material, component (i) (the polyphenolic substance) is generally present in an amount of at least 1 wt % and up to about 70 wt % by total weight of components (i) and (ii) or by total weight of the polymer blend material. As both components (i) and (ii) are present in the polymer blend, each component is present in an amount less than 100 wt %. In particular embodiments, component (i), such as a lignin, is present in the polymer blend material in an amount of about, at least, or above, for example, 1, 5, 10, 15, 20, 25, 30, 35, 40, 45, 50, 55, 60, 65, or 70 wt %, or in an amount within a range bounded by any two of the foregoing exemplary values, e.g., at least 1, 5, or 10 wt % and up to 40, 45, 50, 55, 60, 65, or 70 wt % by total weight of components (i) and (ii) or by weight of the polymer blend material.

As noted earlier above, in the polymer blend material, at least a portion of component (i) (polyphenolic substance) is covalently bonded directly or through a linking moiety to component (ii) (polyester). Polyesters containing backbone or pendant functional groups (e.g., carboxylic acid, hydroxy, amine, or amide) can engage in intermolecular grafting between the polyester and polyphenolic substance (e.g., lignin) by condensation, in the case of the polyester containing pendant carboxylic acid functional groups; by transesterification, in the case of the polyester containing pendant ester functional groups; or by free radical generation and subsequent capture by the phenolic substance, in the case of the polyester containing vinyl functional groups. For example, the polyester may be a polyhydroxyalkanoate or diol-diacid type polymer, as described above (e.g., PBS), functionalized with amine or amide groups.

An intermediary small molecule (i.e., linking molecule or linking moiety) may alternatively or in addition be used to establish a covalent linkage between the polyester and polyphenolic substance. The intermediary small molecule contains functional groups (e.g., carboxylic acid, ester, hydroxy, epoxy, or amine groups) capable of establishing a covalent linkage between the polyester and polyphenolic substance. Generally, the linking molecule has a molecular weight of up to or less than 1000, 800, or 500 g/mol. In particular embodiments, the intermediary small molecule contains two, three, four, or more carboxylic acid and/or ester (carboxylic acid ester) functional groups, which liberate water or an alcohol, respectively, when undergoing transesterification with the polyester and/or polyphenolic substance. The linking molecule may be, for example, a dicarboxylic acid, tricarboxylic acid, or tetracarboxylic acid, which may be saturated or unsaturated by not containing or containing, respectively, at least one carbon-carbon double bond. Some examples of dicarboxylic acids include oxalic acid, malonic acid, succinic acid, maleic acid, fumaric acid, malic acid, adipic acid, tartaric acid, oxaloacetic acid, muconic acid, itaconic acid, glutaconic acid, aspartic acid, glutamic acid, suberic acid, sebacic acid, and terephthalic acid. Some examples of tricarboxylic acids include citric acid, isocitric acid, aconitic acid, trimesic acid, and propane- 1,2,3-tricarboxylic acid. Some examples of tetracarboxylic acids include ethylenediaminetetraacetic acid (EDTA), biphenyl-3,3',5,5'-tetracarboxylic acid, 1,2,3,4-butanetetracarboxylic acid, 1,2,4,5-tetrakis(4-carboxyphenyl)benzene, ethylenetetracarboxylic acid, and furantetracarboxylic acid. Some examples of linking molecules containing two or more carboxylic acid ester groups include esterified versions of any of the above, e.g., triethyl citrate. Compounds containing two or more epoxide groups (i.e., polyepoxide compounds) may also be used as linking molecules, particularly in the case where the polyester is functionalized with hydroxy groups. Some examples of polyepoxide compounds include diepoxybutane, bisphenol A diglycidyl ether, 1,4-butanediol diglycidyl ether, resorcinol diglycidyl ether, triglycidyl isocyanurate, and tris(4-hydroxyphenyl)methane triglycidyl ether. Once linked between components (i) and (ii), the linking molecules form linking moieties that establish indirect covalent bonds between components (i) and (ii).

The polymer blend material described herein may or may not also include one or more additional components. For example, in some embodiments, an agent that favorably modifies the physical properties (e.g., tensile strength, modulus, and/or elongation) may be included. Some of these modifying agents include, for example, carbon particles, metal particles, silicon-containing particles (e.g., silica or silicate particles), ether-containing polymers, Lewis acid compounds, solvents, plasticizers, and metal oxide compounds. In some embodiments, one or more such modifying agents are each independently, or in total, present in an amount of up to or less than 40, 30, 20, 15, 10, 5, 4, 3, 2, or 1 wt % by weight of the polymer blend material, or one or more such components are excluded from the polymer blend material.

The carbon particles, if present in the polymer blend material, can be any of the carbon particles known in the art that are composed at least partly or completely of elemental carbon, and may be conductive, semiconductive, or non-conductive. The carbon particles may be nanoparticles (e.g., at least 1, 2, 5, or 10 nm, and up to 20, 50, 100, 200, or 500 nm), microparticles (e.g., at least 1, 2, 5, or 10 µm, and up to 20, 50, 100, 200, or 500 nm), or macroparticles (e.g., above 500 µm, or at least or up to 1, 2, 5, 10, 20, 50, or 100 mm). Some examples of carbon particles include carbon black ("CB"), carbon onion ("CO"), a spherical fullerene (e.g., buckminsterfullerene, i.e., $C_{60}$, as well as any of the smaller or larger buckyballs, such as $C_{20}$ or $C_{70}$), a tubular fullerene (e.g., single-walled, double-walled, or multi-walled carbon nanotubes), carbon nanodiamonds, carbon nanohorns, and carbon nanobuds, all of which have compositions and physical and electrical properties well-known in the art. As known in the art, fully graphitized carbon nanodiamonds can be considered to be carbon onions.

In some embodiments, the carbon particles are made exclusively of carbon, while in other embodiments, the carbon particles can include an amount of one or a combination of non-carbon non-hydrogen (i.e., hetero-dopant) elements, such as nitrogen, oxygen, sulfur, boron, silicon, phosphorus, or a metal, such as an alkali metal (e.g., lithium), alkaline earth metal, transition metal, main group metal (e.g., Al, Ga, or In), or rare earth metal. Some examples of binary carbon compositions include silicon carbide (SiC) and tungsten carbide (WC). The amount of hetero element can be a minor amount (e.g., up to 0.1, 0.5, 1, 2, or 5 wt % or mol %) or a more substantial amount (e.g., about, at least, or up to 10, 15, 20, 25, 30, 40, or 50 wt % or mol %). In some embodiments, any one or more of the specifically recited classes or specific types of carbon particles or any one or more of the specifically recited classes or specific types of hetero-dopant elements are excluded from the carbon particles.

In some embodiments, the carbon particles can be nanoscopic, microscopic, or macroscopic segments of any of the high strength continuous carbon fiber compositions known in the art. Some examples of carbon fiber compositions include those produced by the pyrolysis of polyacrylonitrile (PAN), viscose, rayon, pitch, lignin, and polyolefins, any of which may or may not be heteroatom-doped, such as with nitrogen, boron, oxygen, sulfur, or phosphorus. The carbon fiber may alternatively be vapor grown carbon nanofibers. The carbon particles may also be two-dimensional carbon materials, such as graphene, graphene oxide, or graphene nanoribbons, which may be derived from, for example, natural graphite, carbon fibers, carbon nanofibers, single walled carbon nanotubes and multi-walled carbon nanotubes. The carbon fiber typically possesses a high tensile strength, such as at least 500, 1000, 2000, 3000, 5000, 7,000, or 10,000 MPa, or higher, with a degree of stiffness generally of the order of steel or higher (e.g., 100-1000 GPa). In some embodiments, any one or more classes or specific types of the foregoing carbon particles are excluded from the polymer blend.

An ether-containing polymer, if present in the polymer blend material, can be, for example, a polyalkylene oxide or a copolymer thereof. The ether-containing polymer may function as a compatabilizer for components (i) and (ii). Some examples of polyalkylene oxides include the polyethylene oxides (e.g., polyethylene glycol), polypropylene oxides (e.g., polypropylene glycol), polybutylene oxides, and copolymers thereof or with ethylene, propylene, or allyl glycidyl ether. The ether-containing polymer may also be, for example, a polyvinyl cyanoethyl ether, as described in, for example, U.S. Pat. No. 2,341,553, the contents of which are herein incorporated by reference. The ether-containing polymer may also be, for example, an etherified form of PVA, such as poly(vinyl methyl ether), which may correspond to CAS No. 9003-09-2. The ether-containing polymer may also be, for example, a phenyl ether polymer, which may be a polyphenyl ether (PPE) or polyphenylene oxide (PPO). The ether-containing polymer may also include cyclic ether groups, such as epoxide or glycidyl groups, or as further described in, for example, U.S. Pat. No. 4,260,702, the contents of which are herein incorporated by reference. The cyclic ether polymer may also be a cyclic anhydride modified polyvinyl acetal, as further described in U.S. Pat. No. 6,555,617, or a cyclic or spirocyclic polyacetal ether, as further described in, for example, A. G. Pemba, et al., Polym. Chem., 5, 3214-3221 (2014), the contents of which are herein incorporated by reference. In yet other embodiments, the ether-containing polymer may be a cyclic or non-cyclic thioether-containing polymer, such as a polyphenyl thioether or polyphenylene sulfide. In some embodiments, any one or more classes or specific types of the foregoing ether-containing polymers are excluded from the polymer blend.

Lewis acid compounds, if present in the polymer blend material, can be any of the compounds known in the art having Lewis acid character, i.e., strongly electrophilic by virtue of a deficiency of electrons. Some examples of Lewis acid compounds include boron-containing compounds (e.g., boric acid, borates, borate esters, boranes, and boron halides, such as $BF_3$, $BCl_3$, and $BBr_3$), aluminum-containing compounds (e.g., aluminum hydroxide, aluminates, aluminate esters, and aluminum halides, such as $AlF_3$, $AlCl_3$, and $AlBr_3$), and tin-containing compounds, such as stannic acid, tin esters (e.g., tin(II) acetate or tin(II) 2-ethylhexanoate), tin alkoxides (e.g., tin(IV) ethoxide), and tin halides, such as $SnF_4$, $SnCl_4$, $SnBr_4$, and $SnI_4$. In some embodiments, any one or more classes or specific types of the foregoing Lewis acid compounds are excluded from the polymer blend.

Metal oxide compounds, if present in the polymer blend material, can have any metal oxide composition, typically particulate in form and that can function to improve a physical characteristic of the polymer blend material. The metal of the metal oxide composition can be, for example, an alkali metal, alkaline earth metal, main group metal, transition metal, or lanthanide metal. Some examples of alkali metal oxides include $Li_2O$, $Na_2O$, $K_2O$, and $Rb_2O$. Some examples of alkaline earth metal oxide compositions include BeO, MgO, CaO, and SrO. Some examples of main group metal oxide compositions include $B_2O_3$, $Ga_2O_3$, SnO, $SnO_2$, PbO, $PbO_2$, $Sb_2O_3$, $Sb_2O_5$, and $Bi_2O_3$. Some examples of transition metal oxide compositions include $Sc_2O_3$, $TiO_2$, $Cr_2O_3$, $Fe_2O_3$, $Fe_3O_4$, FeO, $Co_2O_3$, $Ni_2O_3$, CuO, $Cu_2O$, ZnO, $Y_2O_3$, $ZrO_2$, $NbO_2$, $Nb_2O_5$, $RuO_2$, PdO, $Ag_2O$, CdO, $HfO_2$, $Ta_2O_5$, $WO_2$, and $PtO_2$. Some examples of lanthanide metal oxide compositions include $La_2O_3$, $Ce_2O_3$, and $CeO_2$. In some embodiments, any one or more classes or specific types of the foregoing metal oxides (or all metal oxides) are excluded from the polymer blend.

Metal particles, if present in the polymer blend material, may be included to modulate the electrical conductivity, thermal conductivity, strength, or magnetic properties of the produced object. The metal particles may be composed of or include, for example, iron, cobalt, nickel, copper, zinc, palladium, platinum, silver, gold, aluminum, silicon, or tin, or a combination thereof. The metal particles may include at least a portion of the metal in its elemental (zerovalent) state. The metal particles may alternatively have a metal carbide, metal nitride, or metal silicide composition. In some embodiments, any one or more classes or specific types of the foregoing metal particles (or all metal particles) are excluded from the polymer blend.

A halogen-containing polymer, which may also function as a modifying agent, may or may not be present in the polymer blend material. The halogen-containing polymer, if present in the polymer blend material, can have the halogen atoms bound to aliphatic (i.e., non-aromatic, e.g., alkyl or alkenyl) or aromatic groups, as described above for a hydroxy-containing polymer. The halogen atoms can be, for example, fluorine, chlorine, and bromine atoms. Some examples of fluorinated polymers include poly(vinyl fluoride), poly(vinylidene fluoride), poly(tetrafluoroethylene), fluorinated ethylene-propylene copolymer, poly(ethylenetetrafluoroethylene), poly(perfluorosulfonic acid), and fluoroelastomers. Some examples of chlorinated polymers include poly(vinyl chloride), polyvinylidene chloride, ethylene-chlorotrifluoroethylene copolymer, polychloroprene, halogenated butyl rubbers, chlorinated polyethylene, chlorosulfonated polyethylene, chlorinated polypropylene, chlorinated ethylene-propylene copolymer, and chlorinated polyvinyl chloride. Some examples of brominated polymers include poly(vinyl bromide), and brominated flame retardants known in the art, such as brominated epoxy, poly (brominated acrylate), brominated polycarbonate, and brominated polyols.

In another aspect, the present disclosure is directed to methods for producing the polymer blend material described above. The process generally employs melting and blending of the components; thus, the process may be referred to as a "melt blending" process. The process for preparing the polymer blend material can employ any of the weight percentages (i.e., wt %) of components provided in the above earlier description of the polymer blend material. In the method, at least (or only) the components (i) and (ii) are mixed and homogeneously blended to form the polymer blend material. Any one of the components can be included in liquid form (if applicable), in solution form, or in particulate or granular form. In the case of particles, the particles may be, independently, nanoparticles (e.g., at least 1, 2, 5, or 10 nm, and up to 20, 50, 100, 200, or 500 nm), microparticles (e.g., at least 1, 2, 5, or 10 µm, and up to 20, 50, 100, 200, or 500 µm), or macroparticles (e.g., above 500 µm, or at least or up to 1, 2, 5, 25, 50, 100, 500, or 1000 mm). Typically, if a polymeric component is provided in particle or granular form, the particles are melted or softened by appropriate heating to permit homogeneous blending and uniform dispersion of the components. The temperature employed for melting the components is generally at or above the glass transition temperature of components (i) and (ii) while being below the decomposition temperature of components (i) and (ii), generally a temperature of at least 80° C., 90° C., or 100° C. and no more than or less than 150° C., 200° C., 220° C., or 240° C. The components can be homogeneously blended by any of the methodologies known in the art for achieving homogeneous blends of solid, semi-solid, gel, paste, or liquid mixtures. Some examples of applicable blending processes include simple or high speed melt mixing, compounding, extrusion, two-roll milling, or ball mixing, all of which are well-known in the art. In some embodiments, one or more of the components are in solid bale form and these are cut into useable chunks using standard bale cutting tools. The chunks of the components are typically mixed, melted, and blended (melt blended) in an internal mixer, such as a Banbury mixer. In other embodiments, one or more of the components are in sheet form and the components are mixed in a two-roll mill. The polymer blend typically exhibits a melt viscosity of no more than 500, 1000, 1500, or 2000 Pa·s at a shear rate of 100-1000 $s^{-1}$ when heated to a temperature of no more than 240° C.

The melt blending process is conducted at a temperature at which the components (i) and (ii) melt, provided that the temperature is below the decomposition temperature of the lignin or other polyphenolic substance. For example, the melt process may be conducted at a temperature of at least or above 100° C., 120° C., 130° C., 140° C., or 150° C., and up to or less than 160° C., 170° C., 180° C., 190° C., 200° C., 210° C., 220° C., 230° C., or 240° C., or within a range bounded by any two of the foregoing temperatures. In some embodiments, in order to provide the melt of the polymer blend material with the proper viscosity and toughness to be melt extruded to form an object, the melt of the polymer blend material may be subjected to a suitable shear rate, such as a shear rate within a range of 100-1000 $s^{-1}$ (for sufficient time) to achieve a melt viscosity of no more than 2000, 1500, 1000, or 500 Pa·s. In different embodiments, a shear rate of precisely or about 100, 150, 200, 250, 300, 350, 400, 450, 500, 600, 700, 800, 900, 1000, 2000, 3000, 4000, 5000, 10,000, 15,000, or 20,000 $s^{-1}$ is employed, or a shear rate within a range bounded by any two of the foregoing values is employed, to result in a melt viscosity of precisely, about, up to, or less than, for example, 2000, 1500, 1250, 1000, 900, 800, 700, 600, 500, 400, 300, 200, or 100 Pa·s, or a melt viscosity within a range bounded by any two of the foregoing values.

The result of the above process is a polymer blend material in melt or solid form in which the components are homogeneously blended to form a multiphase blend, i.e., component (i) is homogeneously dispersed component (ii), typically with distinct microscopic domains of component (i) in component (ii) as matrix. By being "homogeneously blended" is meant that, in the macro (e.g., millimeter) scale, no discernible regions of at least components (i) and (ii) exist in the polymer blend material produced by the above process. If a modifying agent, as discussed above, is included, all or a portion of the modifying agent may or may not remain in the solid (unmelted) phase, e.g., either in elemental state (e.g., carbon particles) or in crystalline lamella phase (e.g., polyethylene oxide). In other words, the homogeneous blend may possess a modified or compatibilized phase structure (not necessarily a single phase structure, but often with retained but shifted $T_g$ associated with individual phases) for at least components (i) and (ii). The modified-phase structure generally indicates near homogeneous integration at microscale or near the molecular level without losing each component's identity. In the case of an additional non-homogeneous component, the instantly described polymer blend including components (i) and (ii) can be viewed as a "homogeneous matrix" in which the additional non-homogeneous component is incorporated. In preferred embodiments, each of the components retains their identities, and the components are well dispersed at the nanometer scale.

In some embodiments, a small fraction of component (i) is grafted to component (ii) to improve the compatibility between the components. For example, the domain size and structure of a two-phase reactively blended lignin material impacts the mechanical properties of the final material, and that domain size and structure can be manipulated by controlling the compatibility of the two phases. In some instances, compatibility can be further increased by increasing the polar character of the matrix polymer, such as by inclusion of hydroxy or carboxylic acid groups.

The method for producing the polymer blend material includes conditions that result in covalent attachment of at least a portion of the polyphenolic substance directly or through a linking moiety to the polyester. Substances that result in covalent linking between the components have been described above. Any such substance (e.g., citric acid or any other type of linker molecule described above) can be included in the melt blend process in addition to components (i) and (ii) and optional modifying substance.

In some embodiments, a substance or molecule that promotes covalent attachment between components (i) and (ii) is included as a component in the blend mixture, in addition to components (i) and (ii) and optional modifying substance. The substance or molecule that promotes covalent attachment may be referred to herein as a catalyst or promoter. The catalyst may be, for example, a lignosulfate or metal alkoxides. In more specific embodiments, transesterification between components (i) and (ii) can be effected under high shear conditions in the presence of a solid or liquid acid catalyst, or an organometallic catalyst. A simple solid acid catalyst that has herein been found to initiate transesterification in the polymer melt is a lignosulfonate. Lignosulfonates are lignins that display sulfonate groups on their surface, generated during the sulfite pulping process of woody biomass. These sulfonate groups are acidic and can act in a catalytic manner to effect transesterification of lignin and a matrix polymer with intramolecular ester linkages. Notably, since lignosulfonates are inherently lignin molecules, they would have a minimal disruptive impact on the structure of any resulting polymers. Numerous other sulfonated organic molecules or polymers, such as sulfonated carbonized biomass (e.g., sulfonated starch or cellulose), may also function as solid acid catalysts.

In some embodiments, the substance or molecule that promotes or catalyzes covalent attachment between components (i) and (ii), such as by transesterification, is a metal alkoxide. The metal alkoxide is generally represented by the formula M(OR)y, wherein M is the metal in cationic form and OR is the alkoxide, wherein R is a hydrocarbon group, such as defined earlier above. The subscript y should be sufficient to counterbalance the charge of M and is typically 2, 3, 4, 5, or 6. M is typically a transition metal, Group 13 element, alkali metal, or alkaline earth metal. As noted above, the hydrocarbon group (R) can be any saturated or unsaturated hydrocarbon group, typically containing 1, 2, 3, 4, 5, 6, 7, 8, 9, 10, 11, or 12 carbon atoms or a number of carbon atoms within a range bounded by any two of the foregoing values (e.g., 1-12, 2-12, 3-12, 4-12, 4-10, 4-8, 1-6, 1-4, or 1-3 carbon atoms). The hydrocarbon group (R) may be, for example, a straight-chained (linear) or branched alkyl or alkenyl group, or saturated or unsaturated cyclic hydrocarbon group. In some embodiments, the hydrocarbon group (R) is an alkyl group having one, two, three, four, five, or six carbon atoms, such as a methyl, ethyl, n-propyl, isopropyl, n-butyl, sec-butyl, n-pentyl, isopentyl, cyclopentyl, n-hexyl, isohexyl, or cyclohexyl group. The hydrocarbon group may, in some cases, be or include an unsaturated ring, such as a phenyl group.

The metal alkoxide may be, for example, a transition metal alkoxide, Group 13 metal alkoxide, alkali metal (Group 1) alkoxide, or alkaline earth metal (Group 2) alkoxide. The transition metal may be selected from among any of the transition metal elements in Groups 3-12 of the Periodic Table of the Elements or subgrouping thereof, and may additionally be either a first row, second row, or third row transition metal. The transition metal may be, for example, scandium, titanium, vanadium, chromium, manganese, iron, cobalt, nickel, copper, zinc, yttrium, zirconium, niobium, molybdenum, ruthenium, hafnium, tantalum, and tungsten. Some particular examples of transition metal alkoxides include titanium (IV) methoxide, titanium(IV) ethoxide, titanium (IV) n-propoxide, titanium (IV) isopropoxide, titanium (IV) n-butoxide, titanium (IV) tert-butoxide, vanadium (V) triisopropoxide oxide, chromium (III) isopropoxide, iron (III) ethoxide, iron (III) isopropoxide, cobalt (II) isopropoxide, copper (II) isopropoxide, nickel aluminum isopropoxide, zirconium (IV) tert-butoxide, niobium (V) ethoxide, and hafnium (IV) n-butoxide. The Group 13 metal alkoxide may be, for example, an aluminum alkoxide, such as aluminum butoxide, aluminum tert-butoxide, or aluminum isopropoxide, or a gallium or indium analogue of any of the foregoing aluminum alkoxides. The alkali metal alkoxides may be, for example, a lithium alkoxide, sodium alkoxide, or potassium alkoxide, wherein the alkoxide may be, for example, methoxide, ethoxide, n-propoxide, isopropoxide, n-butoxide, isobutoxide, or tert-butoxide. The alkaline earth metal alkoxides may be, for example, a magnesium alkoxide, calcium alkoxide, strontium alkoxide, or barium alkoxide, wherein the alkoxide may be, for example, methoxide, ethoxide, n-propoxide, isopropoxide, n-butoxide, isobutoxide, or tert-butoxide. The metal alkoxides may also possibly be a lanthanide alkoxides, such as lanthanum (III) isopropoxide, cerium (III) isopropoxide, or neodymium (III) isopropoxide.

In another aspect, the invention is directed to a method for producing an object made of the solid polymer blend material described above. In one set of embodiments, the polymer blend produced by melt blending is in melt form, and the melt is formed into an object, such as by employing an extrusion or casting process on the melt. In another set of embodiments, the polymer blend produced by melt blending is in solid form (i.e., after sufficient cooling and solidification), and the solid polymer blend is used as a feed material in a shape-forming or object-building process in which the solid polymer blend is melted in a successive step and then formed into an object as above, such as by employing an extrusion or casting process on the melt. Notably, the melting process, whether on the components (i) and (ii) during blending, or on the solid polymer blend, should be below the decomposition temperature of the lignin or other polyphenolic substance.

In some embodiments, the melting process occurs in a heating chamber containing a nozzle, and pressure is induced on the melt of the polymer blend material while the polymer blend material is in the heating chamber to adjust the flow rate of the melt through the nozzle to result in the melt having a melt viscosity of no more than 2000, 1500, 1000, 800, or 500 Pa·s. By one exemplary method, the heating chamber is connected to (which may include being in contact with) a piston that induces pressure on the melt of the polymer blend material as the piston pushes the melt through the nozzle. By another exemplary method, pressure is induced on the melt of the polymer blend material by exerting pressure on a solid filament of the polymer blend material as the solid filament is being fed into the heating chamber, wherein the pressure pushes the solid filament into the heating chamber at a desired flow rate. In other embodiments, the polymer blend is provided with the desired melt viscosity by subjecting the melt to a suitable shearing force, such as any of the shearing forces described above.

In a first set of embodiments, the melted polymer blend is subjected to a casting process to form an object. The casting process can be, for example, injection molding, or more specifically, a resin transfer molding process, all of which are well known in the art. The casting process may alternatively be a compression molding process, as also well known in the art.

In a second set of embodiments, the melted polymer blend is subjected to a melt extrusion process to produce a desired shape of the polymer blend. The melt extrusion process can be, for example, any of the additive manufacturing (AM) processes known in art. In the AM process, the solid polymer blend material or a melt version of the blend material can be used as feed material in an AM device. In the case where the solid polymer blend material is used as feed material, the AM device typically includes device components (e.g., a chamber with required heating and mixing elements) for melting, mixing, and applying the necessary pressure and/or shear forces to the polymer blend material to provide the melt with the necessary viscosity. The AM process can be any of the additive processes well known in the art, such as a rapid prototyping (RP) unit, or more particularly, a fused deposition modeling (FDM) unit or a fused filament fabrication (FFF) device. The AM device may be, more particularly, a 3D printer. As well known in the art, the additive process (particularly FDM or 3D printing process) generally operates by hot extruding the build material (in this case, the polymer blend material) through a die or nozzle of suitable shape, and repeatedly depositing discrete amounts (e.g., beads) of the build material in designated locations to build an object. The temperature of the melted polymer blend material, when exiting the nozzle, can be any of the temperatures, as provided above, at which melting is conducted, or a temperature at which the polymer blend material is extrudable but not in a completely melted state, i.e., a temperature slightly below (e.g., 1-10° C. below) the melting temperature of the polymer blend material. In some embodiments, to form the melt, the solid polymer blend is subjected to a temperature of at least or above the glass transition temperature and no more than 10° C. above the glass transition temperature of the solid polymer blend material and no more than 240° C. (the degradation temperature of lignin) to produce a melt of the solid polymer blend material.

Upon exiting the die (i.e., nozzle) in the AM unit, the polymer blend material cools and solidifies. In the FDM or 3D printing process, the nozzle is moved in precise horizontal and vertical positions as beads of the polymer blend material are deposited. In this way, the additive process can build an object layer by layer using the feed material. The nozzle movements and flow rate are generally controlled by computer software, typically a computer-aided manufacturing (CAM) software package. The FDM or 3D printer builds an object (article) based on instructions provided by a computer program that includes precise specifications of the object (article) to be constructed. The object may be useful as, for example, a structural support, such as a component of the interior or exterior of an automobile, furniture, a tool or utensil, or a structural object (e.g., sheet or plate). In some embodiments, the polymer blend may correspond to a coating or film, such as a protective film.

In still other aspects, the invention is directed to an article containing the polymer blend material described above. The article may be one in which some degree of toughness and/or mechanical strength is present. The blend may or may not be further reinforced with, for example, continuous or particulate carbon particles, ceramic (e.g., metal oxide) particles, or metallic particles to produce composite parts, wherein the term "particles" may include fibers. In some embodiments, the "particles" may include fibers, granules, or fibrils of organic materials, such as natural fibers, whiskers, cellulose, fibers, plastic fibers, cellulose nanocrystals, or nanofibers. The article may be used as or included in any useful component, such as a structural support, the interior or exterior of an automobile, furniture, a tool or utensil, or a sheet or plate. In some embodiments, the polymer blend material may be produced and applied as a coating or film, such as a protective film. The polymer blend material may be rendered as a coating or film by, for example, melting the blend or dissolving the components of the blend in a suitable solvent, followed by application of the liquid onto a suitable substrate and then solvent removal.

Examples have been set forth below for the purpose of illustration and to describe certain specific embodiments of the invention. However, the scope of this invention is not to be in any way limited by the examples set forth herein.

EXAMPLES

Synthesis of Lignin-Polyester Polymer Blend Materials

Figure 1A:
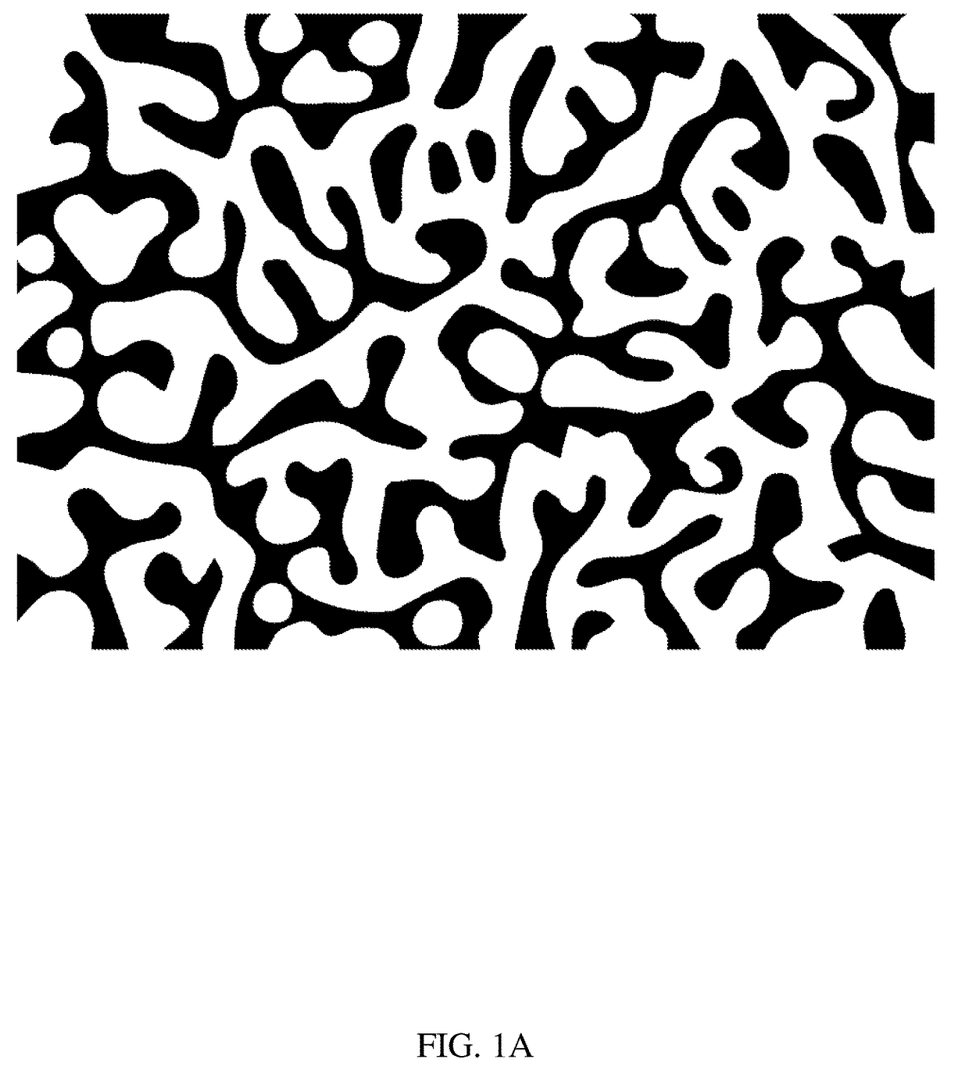
FIGS. 1A and 1B are representations of the two-phase morphological structure of some exemplary polymer blend materials described herein, wherein the polyphenolic material domain size and structure contained within the matrix polymer can be controlled by the type and amount of each material, additives, and processing conditions.
Figure 1B:
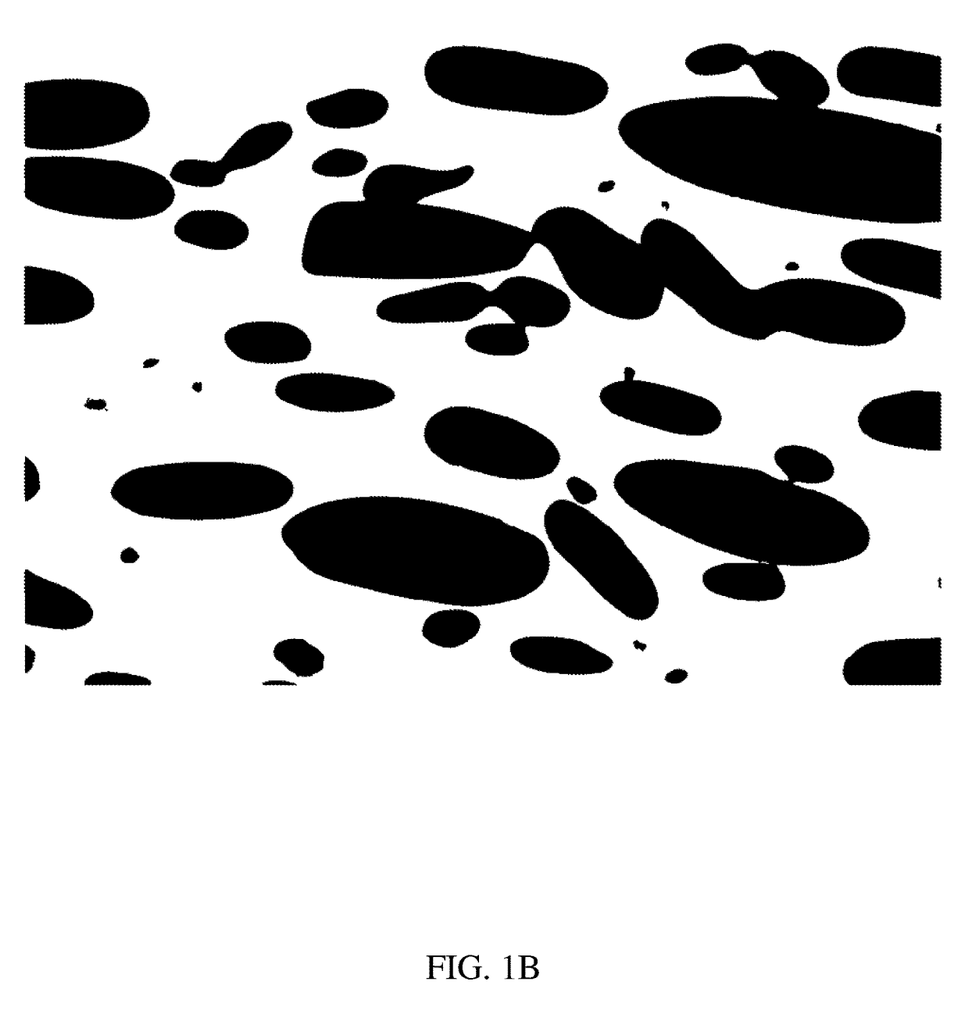

Several samples were prepared from a blend of (1) an ethanol-organosolv extracted hardwood lignin and either: (2a) a polyhydroxyalkanoate, produced from a microbial fermentation pathway or (2b) polycaprolactone or polybutylene succinate, produced from a traditional petroleum feedstock pathway. FIGS. 1A and 1B are representations of the two-phase morphological structure of some exemplary polymer blend materials described herein, wherein the polyphenolic material domain size and structure contained within the matrix polymer can be controlled by the type and amount of each material, additives, and processing conditions. FIG. 1A depicts an interpenetrating network and FIG. 1B depicts an occluded network. Both morphologies are possible by controlling the different parameters described. The black domains represent the polyphenolic polymer (e.g., lignin) and the white (transparent) domains represent the matrix polyester polymer.

The general procedure is as follows. Amounts of lignin between 10 and 50 wt % were combined and blended with one of the above polymers using a Brabender® Intelli-Torque Rheometer fitted with a 60 cc mixing chamber and twin roller blades, with the internal chamber heated to a temperature above the glass transition temperature (Tg) of the matrix polymer. The matrix polymer was added at a rotor speed between 50 and 90 rpm and allowed to melt to a constant torque (about 5 minutes). Lignin was added, and the mixture was sheared for a combined total of between 10 and 30 minutes. In some preparations, the mixture was sheared for between 2 and 10 minutes, followed by addition of a small amount (between 0.1 and 5%) of a molecule (e.g., polycarboxylic acid, such as citric acid, or a lignosulfonate or metal alkoxide) to promote additional covalent bonding. The mixture continued to be sheared for a combined total of between 10 and 30 minutes. In a few samples, a small amount (e.g., between 2 and 10 wt %) of a third polymer was introduced as a compatibilizer, such as a polyethylene oxide. After shearing was complete, the polymer blend was allowed to cool by air to room temperature before further processing into specimens suitable for mechanical testing. In some embodiments, the mixing temperature was 50° C. above the $T_g$ of the matrix. In another embodiment, the mixing temperature was 100° C. above the $T_g$ of the matrix. In yet other embodiments, the mixing temperature was 20° C. above the $T_g$ of the matrix.

Results

Figure 2:
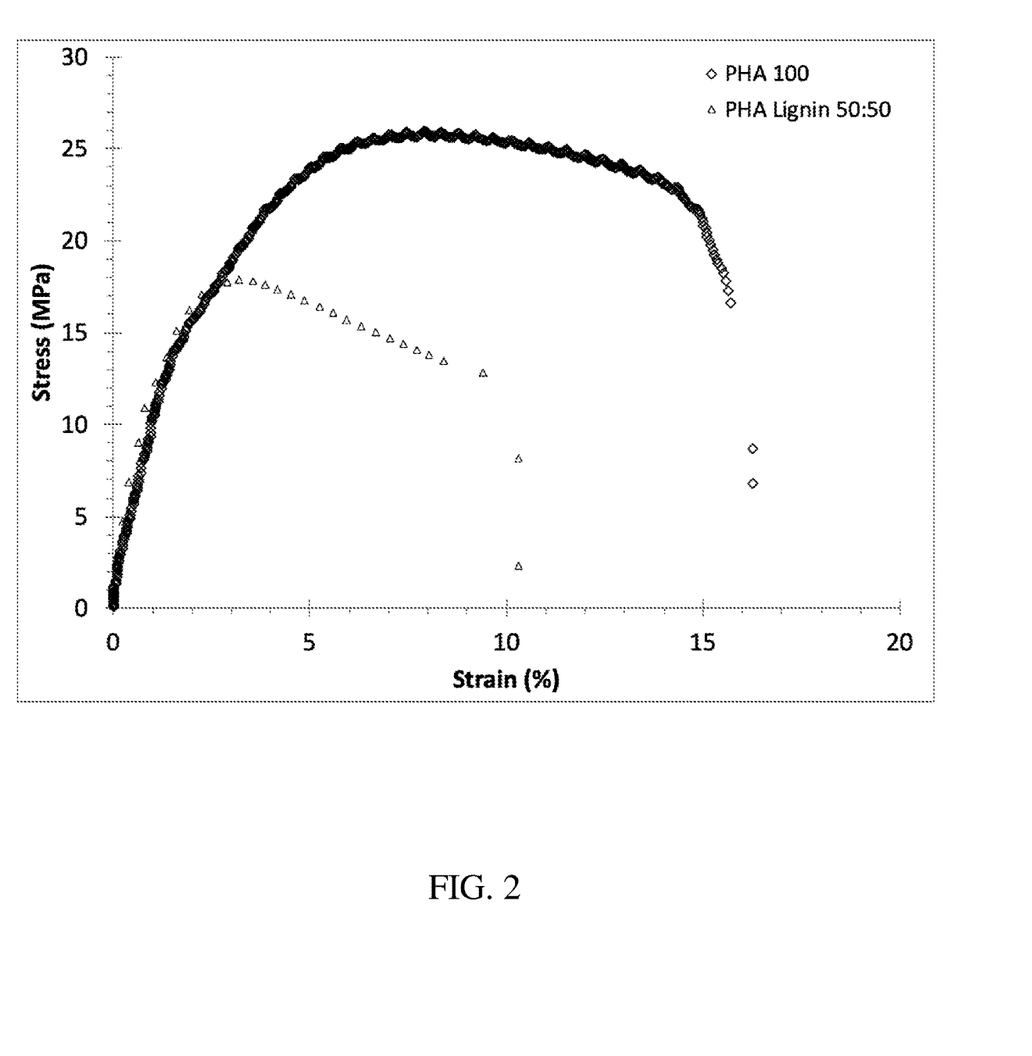
FIG. 2 is a stress-strain graph comparing neat poly(3-hydroxybutyrate-co-4-hydroxybutyrate) and a 50:50 alloy of poly(3-hydroxybutyrate-co-4-hydroxybutyrate) and ethanol-organosolv hardwood lignin.

Two samples were prepared that were suitable for mechanical testing, one being a 50 wt % blend of lignin and poly(3-hydroxybutyrate-co-4-hydroxybutyrate) and the other being a 50 wt % blend of lignin and polycaprolactone. Specimens of each sample were cut using an ASTM D638 Type V die from a compression molded sheet, and processed using a universal testing frame with pneumatic grips following the ASTM D638 method for tensile testing of thermoplastics. The stress-strain profile of the lignin and poly(3-hydroxybutyrate-co-4-hydroxybutyrate) blend is displayed in FIG. 2, relative to a specimen of neat poly(3-hydroxybutyrate-co-4-hydroxybutyrate) resin.

While there have been shown and described what are at present considered the preferred embodiments of the invention, those skilled in the art may make various changes and modifications which remain within the scope of the invention defined by the appended claims.

What is claimed is:

1. A solid multiphase polymer blend material comprising:
   (i) an uncrosslinked lignin having a molecular weight of at least 500 g/mol; and
   (ii) a polyester having a molecular weight of at least 500 g/mol;
   wherein at least a portion of the uncrosslinked lignin is covalently bonded directly or through a linking moiety to the polyester.

2. The solid polymer blend material of claim 1, wherein said uncrosslinked lignin comprises a lignosulfonate.

3. The solid polymer blend material of claim 1, wherein said uncrosslinked lignin is selected from the group consisting of organosolv lignin, Kraft lignin, soda lignin, and supercritical water fractionated lignin.

4. The solid polymer blend material of claim 1, wherein said uncrosslinked lignin comprises a Kraft lignin.

5. The solid polymer blend material of claim 1, wherein said polyester is a polyhydroxyalkanoate having the following structure:

wherein $R^1$ is selected from a hydrogen atom or hydrocarbon group, t is an integer from 0 to 4, n is an integer of at least 10, and said structure can be a homopolymer or copolymer.

6. The solid polymer blend material of claim 5, wherein said polyhydroxyalkanoate is selected from the group consisting of polylactic acid, polyglycolic acid, poly(3-hydroxypropionic acid), poly(hydroxybutyric acid)s, poly(hydroxyvaleric acid)s, poly(hydroxyhexanoic acid)s, polycaprolactone, polymandelic acid, and copolymers thereof.

7. The solid polymer blend material of claim 5, wherein said polyhydroxyalkanoate comprises polycaprolactone, polylactic acid, polyglycolic acid, or copolymer thereof.

8. The solid polymer blend material of claim 1, wherein said polyester is a diol-diacid polyester having the following structure:

wherein $R^2$ and $R^3$ are independently selected from hydrocarbon linking groups containing 1-14 carbon atoms, and n is an integer of at least 10.

9. The solid polymer blend material of claim 8, wherein said diol-diacid polymer is selected from polyethylene succinate, polybutylene succinate, polybutylene muconate, polybutylene itaconate, polyethylene terephthalate, polybutylene terephthalate, polybutylene adipate, polybutylene succinate adipate, polybutylene adipate terephthalate.

10. The solid polymer blend material of claim 1, wherein the polyester has carbon-carbon unsaturated bonds.

11. The solid polymer blend material of claim 1, wherein the solid polymer blend further comprises a polycarboxylic acid or polyester molecule having a molecular weight less than 500 g/mol.

12. The solid polymer blend material of claim 1, wherein the uncrosslinked lignin has a molecular weight of at least 2500 g/mol.

13. The solid polymer blend material of claim 1, wherein the polyester has a molecular weight of at least 2500 g/mol.

14. The solid polymer blend material of claim 1, further comprising: (iii) a polyalkyleneoxide.

15. A method for producing a solid multiphase polymer blend material, the method comprising homogeneously melt blending a mixture comprising: (i) an uncrosslinked lignin having a molecular weight of at least 500 g/mol; and (ii) a polyester having a molecular weight of at least 500 g/mol, under conditions resulting in covalent attachment of at least a portion of the uncrosslinked lignin directly or through a linking moiety to the polyester.

16. The method of claim 15, wherein said conditions resulting in covalent attachment comprise incorporating into said mixture a molecule that promotes covalent attachment of at least a portion of the uncrosslinked lignin directly or through a linking moiety to the polyester.

17. The method of claim 16, wherein said molecule that promotes covalent attachment comprises a polycarboxylic acid or polyester molecule having a molecular weight less than 500 g/mol.

18. The method of claim 16, wherein said molecule that promotes covalent attachment comprises a lignosulfonate.

19. The method of claim 15, wherein said molecule that promotes covalent attachment comprises a metal alkoxide.

20. The method of claim 19, wherein said metal alkoxide is an aluminum alkoxide or titanium alkoxide.

21. The method of claim 15, wherein said uncrosslinked lignin is selected from the group consisting of organosolv lignin, Kraft lignin, soda lignin, and supercritical water fractionated lignin.

22. The method of claim 15, wherein said uncrosslinked lignin comprises a Kraft lignin.

23. The method of claim 15, wherein said polyester is a polyhydroxyalkanoate having the following structure:

(1)

wherein $R^1$ is selected from a hydrogen atom or hydrocarbon group, t is an integer from 0 to 4, n is an integer of at least 10, and said structure can be a homopolymer or copolymer.

24. The method of claim 15, wherein said polyester is a diol-diacid polyester having the following structure:

(2)

wherein $R^2$ and $R^3$ are independently selected from hydrocarbon linking groups containing 1-14 carbon atoms, and n is an integer of at least 10.

25. The method of claim 15, wherein the polyester has carbon-carbon unsaturated bonds.

26. A solid multiphase polymer blend material comprising:
(i) a polyphenolic substance having a molecular weight of at least 500 g/mol; and
(ii) a polyester having a molecular weight of at least 500 g/mol;
wherein component (ii) functions as a matrix in which component (i) is dispersed in the form of domains having a size up to 100 microns, and at least a portion of the polyphenolic substance is covalently bonded directly or through a linking moiety to the polyester.

27. The solid polymer blend material of claim 26, wherein said domains have a size of 5 nm to 100 microns.

28. The solid polymer blend material of claim 26, wherein said domains have a size of 50 nm to 50 microns.

* * * * *